Feb. 24, 1948.  A. A. GRIFFITH ET AL  2,436,768
BEARING
Filed Aug. 12, 1943
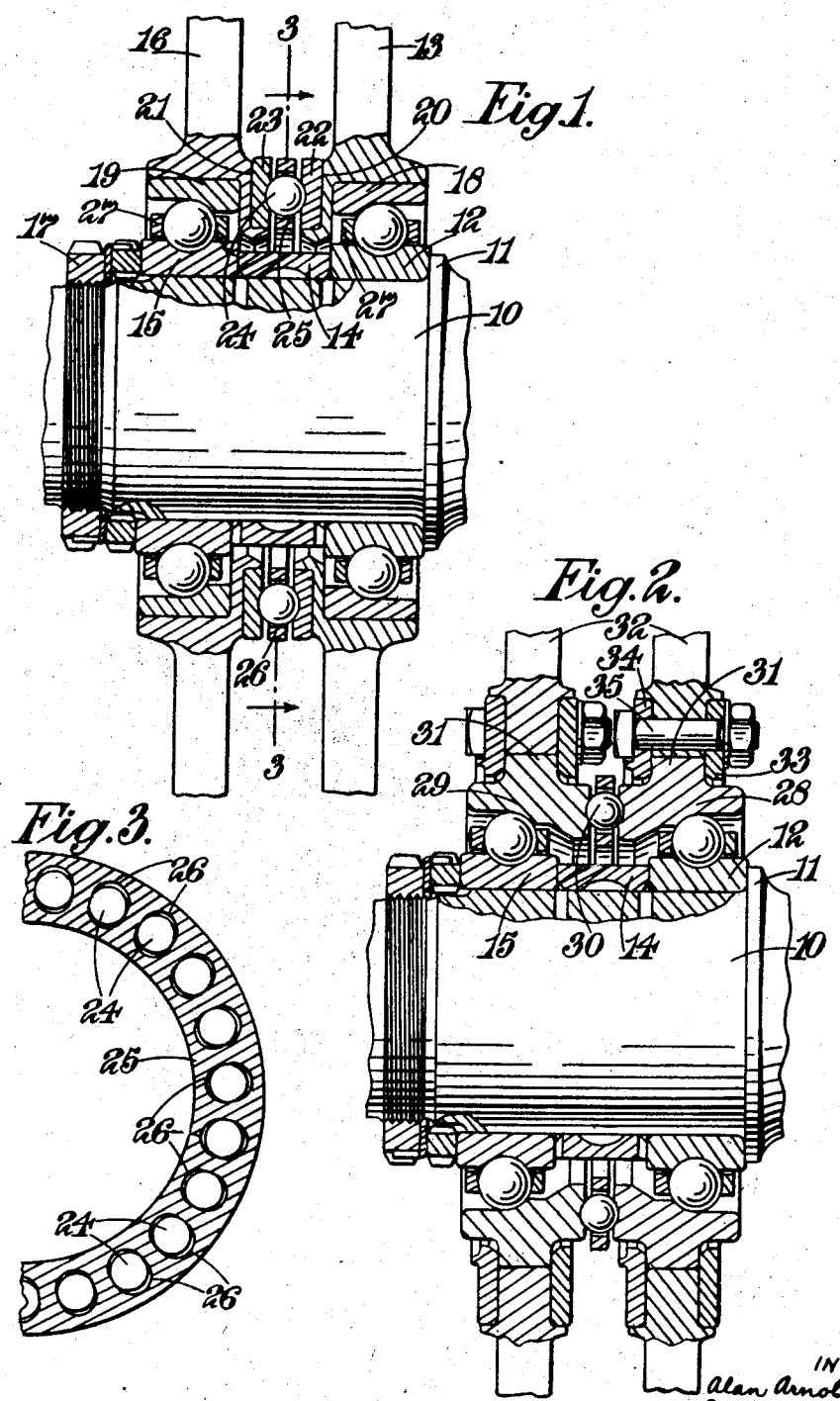
INVENTORS
Alan Arnold Griffith
Donald Eyre
BY Loyd Hall Sutton
ATTORNEY Patented Feb. 24, 1948

2,436,768

UNITED STATES PATENT OFFICE 2,436,768

BEARING

Alan Arnold Griffith and Donald Eyre, Derby, England, assignors to Rolls-Royce Limited, Derby, England, a British company Application August 12, 1943, Serial No. 498,416
In Great Britain January 7, 1941

3 Claims. (Cl. 308—174)

This invention is concerned with an improved construction or arrangement of bearings for compressors and other mechanism comprising a plurality of coaxial rotor elements which rotate in opposite directions and are closely interspaced on a shaft. When used on an aircraft or other vehicle it is necessary to keep the bearing for each rotor-element as short as possible axially, but also adequately to provide for withstanding gyroscopic effects.

According to this invention, a bearing assembly for oppositely rotating adjacent rotors comprises combined radial- and thrust-bearings whereon the rotors are respectively mounted, and a thrust-bearing interposed between the two rotors, which latter gives adequate support against gyroscopic effects and relieves the radial bearings of such undue loadings.

Preferably the radial- and thrust-bearings are arranged to resist axial separation of the rotors and are pre-stressed by an axial compression-loading.

According to another feature of this invention, the races for the thrust-bearing may be provided on the side faces respectively of the outer races of two adjacent combined radial- and thrust-bearings.

According to yet another feature of this invention, each of the said outer races may be formed circumferentially to engage a rotor which is secured on it by means of side plates embracing the adjacent part of the outer race and bolted to the rotor to locate it on the race.

According to yet another feature of this invention, the cage for the balls of the thrust-bearing is provided with radially elongated slots to receive the balls thereof and provide a radial clearance, and it is also found desirable that in the case of the combined radial thrust-bearings, the cage should have a definite clearance from the inner race.

In the accompanying drawings,

Figure 1 is a central section showing one construction in accordance with this invention, Figure 2 is a similar view of an alternative construction, and Figure 3 is a detail view of the cage for the thrust-bearing.

Referring first to Figure 1, the invention is illustrated as applied to a pair of oppositely rotating coaxial rotors, but it will be appreciated that it may be used in connection with a larger number of interspaced oppositely rotating rotors. The shaft carrying the two rotors, shown at 10, is provided with a shoulder 11 or other convenient abutment to locate axially the inner race 12 of a combined radial- and thrust-bearing for a rotor 13. A spacing-member 14 on the shaft separates the race 12 from the inner race 15 for the second rotor 16, and means are provided for applying axial compression to these races. This is shown as a nut 17 screwed on to the shaft although any other desired arrangement may be used, the races 12 and 15 with the spacing-member 14 being compressed against the shoulder 11 of the shaft.

Each of the rotors is carried on the outer race 18, 19 respectively of the combined radial- and thrust-bearings, and these bearings may be of any well-known type arranged to resist axial separation or thrust between them.

Each of the rotors 13, 16 is provided with an axially-directed surface or shoulder shown at 20, 21 respectively facing one another and adapted to receive thrust-races 22, 23 of a plain thrust-bearing whereof the balls are indicated at 24 and the cage at 25. Since the rotors rotate in opposite directions, it will be appreciated that gyroscope effects tend to twist them in opposite directions relatively to the axis of the shaft 10 and this thrust-bearing provides an adequate support against any such tendency by receiving the equal and opposite thrusts from the rotors.

It is found desirable in practice that the cage 25 for the thrust-bearings should be constructed, as shown in Figure 3, with radially elongated slots 26 to receive the balls 24 so that they have a radial clearance and are located only circumferentially with respect to the bearing. The clearance depends upon the diameter of the bearing, and may be of the order of twenty-five thousandths of an inch when the thrust-bearing is about three inches in diameter.

It is also found to be desirable that the cages 27 for the combined radial- and thrust-bearings should have a definite clearance from the inner race; this again will depend upon the size of the bearing and may be of the order of eight to ten thousandths of an inch for a bearing three inches in diameter.

In the alternative construction illustrated in Figure 2, the shaft 10, inner races 12, 15 and spacing-member 14 are similar to those shown in Figure 1 but the outer races for the radial- and thrust-bearings indicated generally by the references 28, 29 are shaped to provide the races for the thrust-bearing whereof the balls are indicated at 30. Each of these races 28, 29 is provided with a circumferential flange-like portion 31 which engages the inner bore of its rotor 32, and the rotor is located on the race 28 by means of side-plates 33, 34 which embrace the portion 31 of the race as well as the inner periphery of the rotor and are clamped thereon by means of bolts 35. The other details of construction relating to the cages are the same in this construction as those illustrated in Figure 1. This construction lends itself conveniently to a closer spacing of the rotors and reduced overall axial length, if this should be desirable.

We claim:

1. In a bearing assemblage, the combination of a shaft, a pair of rotors mounted thereon for rotation in opposite directions, a first radial-and-thrust-bearing comprising an inner race on said shaft and an outer race, one of said rotors being mounted on said outer race, a second radial-and-thrust-bearing comprising an inner race on said shaft and an outer race, the second rotor being mounted on said second outer race, means applying axial pressure on said inner races toward one another, a thrust-bearing comprising two opposed races between said outer races, balls between said two opposed races and a cage locating said balls, said cage being formed with radially elongated slots to receive said balls.

2. In a bearing assemblage, the combination of a shaft, two radial-and thrust-bearings, each comprising an inner race on said shaft and an outer race, a pair of contra-rotating rotors mounted respectively on said outer races, balls between each inner race and its cooperating outer race, means applying axial pressure on said inner races towards one another, an annular spacer surrounding the shaft between said two inner races, and a thrust-bearing between said two outer races comprising a cage extending about said annular spacer and having an internal diameter substantially in excess of that of the external diameter of the annular spacer to provide a substantial radial space between said spacer and cage, said cage having ball openings therethrough in a direction substantially axially of said shaft, and thrust balls mounted in the cage openings and having their radially inner portions spaced by the inner part of the cage and by said differential diameters of the cage and spacer from any radial contact with said spacer.

3. A bearing assemblage as claimed in claim 2 characterized by the fact that the cage is a narrow flat ring having its edgewise dimension normal to the axis of said shaft with the thrust balls of greater diameter than said edgewise dimension of the cage whereby to project from the thrust openings of the cage at both sides thereof into sockets carried by the outer races whereby the thrust balls and the cage are supported by said sockets of the outer races and have no radial contact and no radial bearing characteristics with reference to said annular spacer which is the part included within said thrust-bearing.

ALAN ARNOLD GRIFFITH.
DONALD EYRE.

REFERENCES CITED

The following references are of record in the file of this patent:

UNITED STATES PATENTS

| Number | Name | Date |
|---|---|---|
| 584,296 | Schuppisser | June 8, 1897 |
| 644,245 | Gates | Feb. 27, 1900 |
| 899,563 | Riebe | Sept. 29, 1908 |
| 1,735,602 | Curtis | Nov. 12, 1929 |
| 1,769,933 | Arutunoff | July 8, 1930 |
| 1,809,699 | Higbee | June 9, 1931 |
| 2,173,508 | Horrocks | Sept. 19, 1939 |

FOREIGN PATENTS

| Number | Country | Date |
|---|---|---|
| 13,337 | Australia | May 15, 1903 |
| 405,380 | France | Dec. 28, 1909 |